E. G. LEDYARD.
BOTTOM DUMP TRAILER.
APPLICATION FILED JAN. 17, 1922.

1,433,895.

Patented Oct. 31, 1922.
2 SHEETS—SHEET 1.

Inventor
E. G. Ledyard
By
Attorney

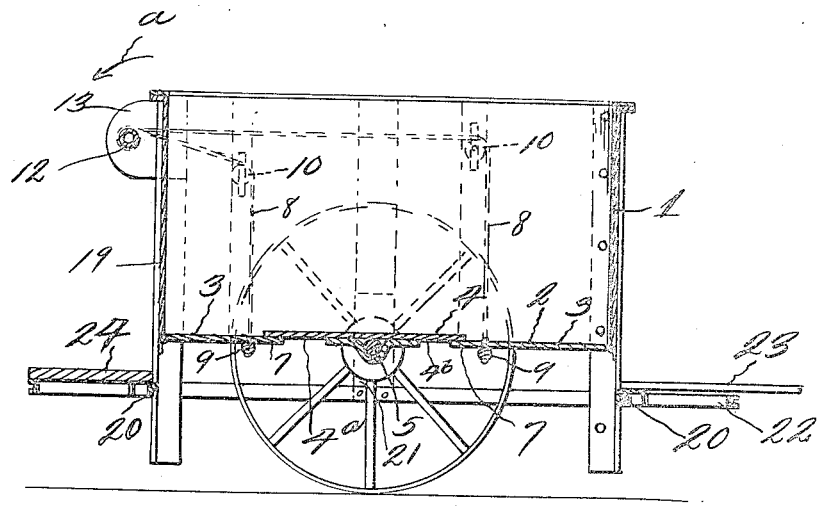
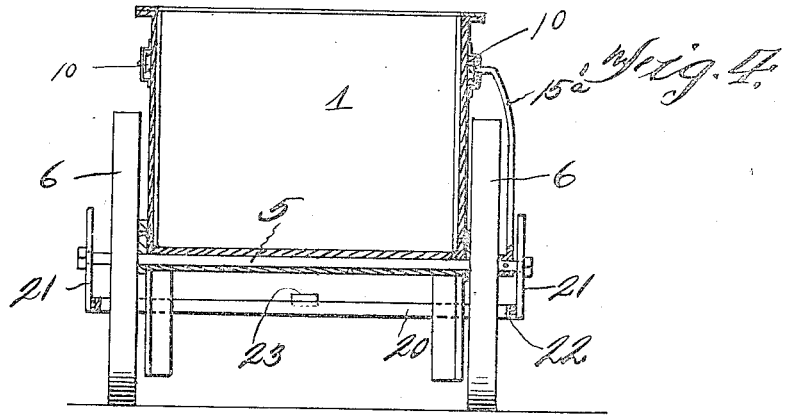

Patented Oct. 31, 1922.

1,433,895

UNITED STATES PATENT OFFICE.

ELISHA G. LEDYARD, OF SIOUX FALLS, SOUTH DAKOTA.

BOTTOM-DUMP TRAILER.

Application filed January 17, 1922. Serial No. 529,818.

*To all whom it may concern:*

Be it known that I, ELISHA G. LEDYARD, a citizen of the United States, residing at Sioux Falls, in the county of Minnehaha, State of South Dakota, have invented a new and useful Bottom-Dump Trailer; and I do hereby declare the following to be a full, clear, and exact description of the invention, such as will enable others skilled in the art to which it appertains to make and use the same.

The invention relates to bottom dump trailers and has for its object to provide a device of this character wherein the bottom is sectional and comprises a bottom central section and hinged end sections, said central section being mounted on a revolving shaft and held against movement by lever and cable means and by the engagement of the free ends of the hinged sections with the under sides of the same.

A further object is to provide means whereby the hinged sections when released may be used for leveling off the dumped load, as the vehicle moves forwardly or rearwardly. Also to form one of the hinged sections wider than the other, thereby providing means whereby the dumped load may be leveled at different elevations.

A further object is to provide in combination with the hinged sections and the body, a rotatable drum having cable connections with the free ends of the hinged sections and forming means whereby said sections are held in closed position or lowered as desired. Also to provide ratchet means for holding said drum against rotation in one direction and holding the hinged sections against movement.

A further object is to provide lever means connected to the cable and forming means whereby upon a movement of the cable, the axle will be rocked and the central section of the bottom of the dump body tilted simultaneously with the movement downwardly of the free end of the hinged sections of the bottom.

A further object is to provide an underslung frame below the axle, and supported by brackets pivoted to the axle, said frame forming means whereby the device may be coupled to other vehicles forming a vehicle train and disposing the draft below the axle, thereby insuring stability when the device is in a vehicle train or being towed.

With the above and other objects in view the invention resides in the combination and arrangement of parts as hereinafter set forth, shown in the drawings, described and claimed, it being understood that changes in the precise embodiment of the invention may be made within the scope of what is claimed, without departing from the spirit of the invention.

In the drawings:—

Figure 3 is a longitudinal sectional view vertically through the dump wagon taken on line 3—3 of Figure 1.

Figure 4 is a vertical transverse sectional view through the dump wagon taken on line 4—4 of Figure 1.

Figure 1:
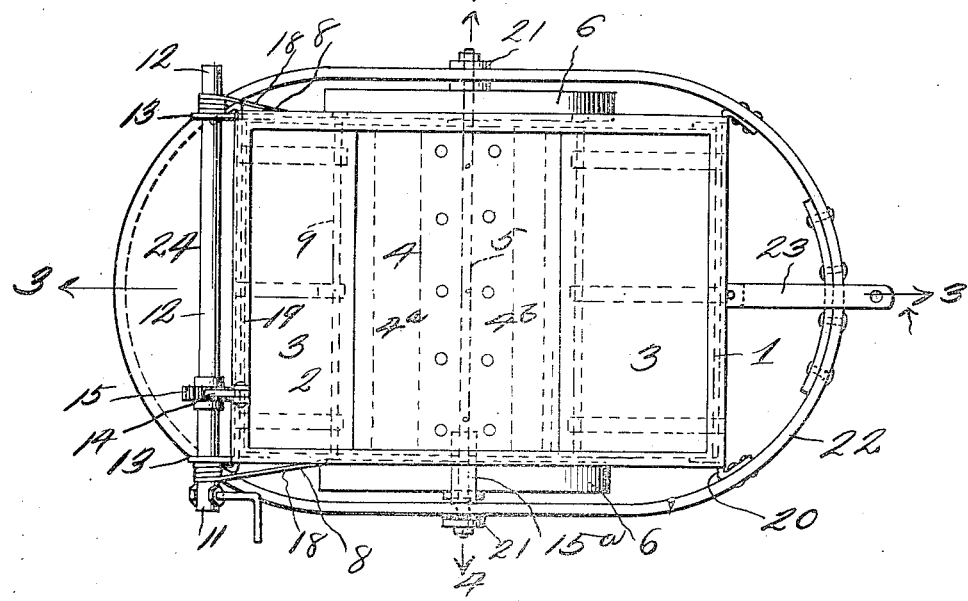
Figure 1 is a top plan view of the dump wagon.
Figure 2:
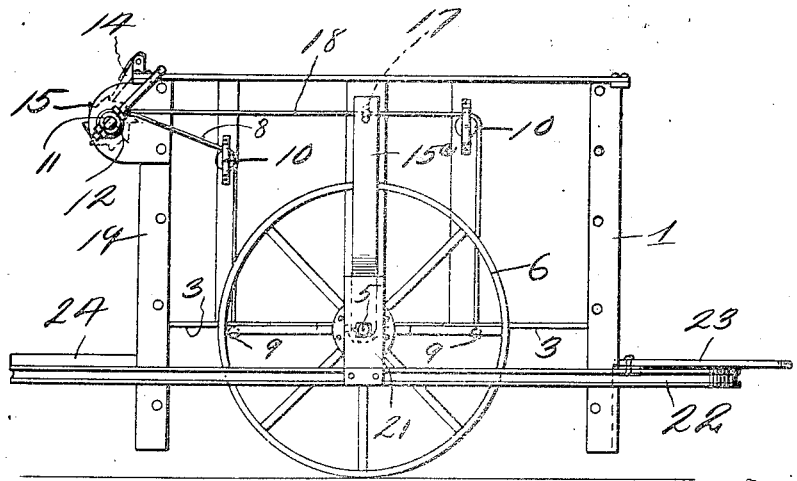
Figure 2 is a side elevation of the dump wagon.

Referring to the drawings, the numeral 1 designates a rectangular shaped body member formed from sheet metal, which body member has its bottom 2 formed from end hinged sections 3 and a centrally disposed tiltable section 4, which section may be tilted downwardly at each free end thereof upon rocking of the axle 5 to which the tiltable section 4 is secured and on which axle the supporting wheels 6 are rotatatbly mounted. When the axle 5 is rocked, it will be seen that the pivoted central section 4 will be moved. The central section 4 of the bottom is held against movement by the engagement of the free ends 7 of the hinged sections 3 with the under surface thereof, and when said hinged sections 3 are held in closed position, the entire bottom 2 is formed in such a manner that the contents of the chamber of the body 1 will be held therein. The hinged sections 3 are held in closed position as shown in Figure 3 by means of cables 8, the lower end of which are secured to transversely disposed bars 9, carried adjacent the ends of the hinged members 3, which cables extend upwardly over pulleys 10 carried by the sides of the body 1, and thence rearwardly over the ends 11 of a rotatable drum 12, which drum is rotatable in bearings of brackets 13 carried by the rear side of the body 1 and is adapted when rotated in the direction of the arrow *a* to impart a pull on the cables 8 simultaneously for closing the hinged sections 3 of the bottom, the drum 12 being prevented from rotation in an opposite direction by means of a dog 14 which cooperates with a ratchet wheel 15, which dog and ratchet wheel prevent downward movement to an open position of the hinged sections 3. However when it is desired to dump a load of material from the chamber of the body 1, the dog 14 is raised, thereby releasing the drum and allowing the hinged sections 3 to move downwardly under the weight of the material.

Secured to the rockable axle 5 is an upwardly extending arm 15$^a$, which arm is secured at 17 to the horizontal portion 18 of one of the cables 8, therefore it will be seen that when the cables are slackened, that said arm will be allowed to move and the axle 5 allowed to rock in its bearing. If after a dumping operation material should still remain on the pivoted section 5, the operator may grasp the arm 15 and vigorously oscillate the same, which action will dislodge any material which may become lodged on the section 4. When the load is freed at the ends of the body, the pivoted section 4 will rock automatically towards the rear end 19 and downwardly for the reason that its portion 4$^a$ rearwardly of the axle 5 is wider than the portion 4$^b$ forwardly of the axle.

It has been found that on many contracting operations that it is necessary not only to haul material and dump the same at a predetermined point, but also to level the material after it has been dumped. To accomplish this result the hinged sections 3 when they move downwardly to a substantially vertical position engage transversely disposed bars 20, and therefore as the device moves in either direction the dump load will be leveled. It will be noted that hinged sections 3 are of different widths, and consequently different elevations of leveling may be accomplished according to the direction of movement of the wagon. Pivotally mounted on the outer ends of the axles 5 and outside of the wheels 6, are downwardly extending brackets 21, to the lower ends of which brackets a horizontally disposed frame 22 is secured, which frame extends entirely around the dump wagon and outside of the wheels, thereby protecting the wheels and at the same time allowing the wheels to be placed closer to the center of the load, consequently the bending strain on the axle is reduced. The frame 22 is underslung in relation to the axle and consequently if the frame is used for draft purposes the drawbar pull will be below the axle, and the danger of overturning of the wagon is reduced to a minimum. The device may be provided with a draw bar 23 to which a similarly constructed dump wagon may be attached and if so desired a platform 24 may be provided on which the operator may stand while operating the device.

From the above it will be seen that a dump wagon is provided which is simple in construction, positive in its operation and one wherein the dumped load may be leveled.

The invention having been set forth what is claimed as new and useful is:—

1. A bottom dump wagon comprising a body having a bottom therein, said body comprising a centrally disposed pivoted section, hinged sections at each side of the centrally disposed section and having their free ends underlying the opposite edges of the pivoted section and cable means controlling the hinged sections and forming means whereby the hinged sections may be lowered for allowing the pivoted section to tilt.

2. A bottom dump wagon comprising a body, a bottom carried by said body, said body comprising a centrally disposed pivoted section, hinged sections disposed to each side of the pivoted section and forming means for engaging the pivoted section and holding the same against movement, a ratchet controlled drum carried by the body, cables connected to the hinged sections adjacent their free ends and controlled by said drums, said central section being secured to a transversely disposed axle, supporting wheels carried by said axle, and an arm carried by said axle and connected to the cable and movable with the cable.

3. The combination with a bottom dump wagon comprising a centrally disposed bottom section, hinged bottom sections disposed to each side of the centrally pivoted bottom section, said central bottom section being carried by a rotatable axle, of controlling means for said bottom sections and hinged sections, said controlling means comprising a rotatable drum, cable connections between the rotatable drum and the hinged sections and a lever connection between the axle and one of the cables.

4. A bottom dump wagon comprising a body member, an axle disposed beneath said body member, said axle having secured thereto a centrally disposed bottom section, supporting wheels on said axle and means whereby said axle may be rotated for tilting the bottom section.

5. A bottom dump wagon comprising a body member, an axle disposed beneath the body member, a bottom section carried by the axle, hinged bottom sections to each side of the axle carried bottom section and normally maintaining said axle carried body section in horizontal position, and lever and cable means whereby the hinged sections may be lowered and the axle carried section tilted.

In testimony whereof I have signed my name to this specification in the presence of two subscribing witnesses.

ELISHA G. LEDYARD.

Witnesses:
W. L. BAKER,
B. H. ORR.